United States Patent
Roodenburg et al.

(10) Patent No.: US 8,104,995 B2
(45) Date of Patent: Jan. 31, 2012

(54) MARINE PIPELINE INSTALLATION TENSIONER

(75) Inventors: Joop Roodenburg, Delft (NL); Eric Romeijn, Zuid-Beijerland (NL); Simon Van Ede, Rotterdam (NL)

(73) Assignee: ITREC B.V., Schiedam (NL)

( * ) Notice: Subject to any disclaimer, the term of this patent is extended or adjusted under 35 U.S.C. 154(b) by 214 days.

(21) Appl. No.: 12/373,253

(22) PCT Filed: Jul. 12, 2006

(86) PCT No.: PCT/NL2006/000357
§ 371 (c)(1),
(2), (4) Date: Feb. 24, 2009

(87) PCT Pub. No.: WO2008/007945
PCT Pub. Date: Jan. 17, 2008

(65) Prior Publication Data
US 2010/0034592 A1      Feb. 11, 2010

(51) Int. Cl.
*F16L 1/23* (2006.01)
(52) U.S. Cl. .................. 405/168.4; 405/168.1; 226/172
(58) Field of Classification Search .................. 405/158, 405/166, 168.1, 168.3, 168.4, 184; 226/172; 254/4 B, 134; 166/77.3; *F16L 1/23*
See application file for complete search history.

(56) References Cited

U.S. PATENT DOCUMENTS

| 4,655,291 A | * | 4/1987 | Cox ............................... 166/385 |
| 5,692,859 A | * | 12/1997 | Dickson et al. ............ 405/168.4 |
| 5,718,538 A | | 2/1998 | Recalde |
| 5,775,417 A | * | 7/1998 | Council ........................ 166/77.3 |
| 6,257,794 B1 | | 7/2001 | Gobled et al. |
| 6,394,445 B1 | | 5/2002 | D'Agrella et al. |
| 6,439,445 B1 | * | 8/2002 | De Groot et al. ............. 226/172 |
| 6,450,385 B1 | * | 9/2002 | Guerin ............................ 226/89 |

FOREIGN PATENT DOCUMENTS

| EP | 0 296 272 A1 | 12/1988 |
| FR | 2 776 721 A1 | 10/1999 |
| FR | 2 778 721 A1 | 11/1999 |
| WO | WO-98/50719 A1 | 11/1998 |
| WO | WO-00/05525 A2 | 2/2000 |

* cited by examiner

*Primary Examiner* — David Bagnell
*Assistant Examiner* — Benjamin Fiorello
(74) *Attorney, Agent, or Firm* — Birch, Stewart, Kolasch & Birch, LLP

(57) ABSTRACT

A marine pipeline installation tensioner comprising a tensioner frame and multiple track units mounted in said frame, wherein each track unit includes an endless track, a chassis, support rollers or other bearing means mounted therein for the endless track, and one more track drive/brake members for effecting drive and/or braking motion of the track, and wherein each track unit is arranged mobile within the associated frame.

Each track unit is arranged mobile within the associated frame by a parallel linkage bar system with parallel linkage bars between the chassis of the track unit and the frame of the tensioner.

10 Claims, 8 Drawing Sheets

//MARINE PIPELINE INSTALLATION TENSIONER

BACKGROUND OF THE INVENTION

1. Field of the Invention

The present invention relates to a marine pipeline installation tensioner, primarily for use in marine pipeline installation wherein a pipeline for transportation of hydrocarbons (oil, gas, etc) is laid on the seabed.

2. Background of the Invention

Tensioners are well known in the field of marine pipelaying, often having the task of supporting the weight of the launched pipeline. Tensioners are used for many pipelaying techniques, such as S-lay, Reel lay, J-lay. Tensioner have a large "load holding capacity" and in the field capacities of tens of tonnes, or even well over 100 tonnes, for a tensioner are not uncommon. An example of a tensioner is disclosed in U.S. Pat. No. 6,439,445.

In a known embodiment a marine pipeline installation tensioner comprises a tensioner frame and multiple track units mounted in said frame. The number of track units is normally adapted to the capacity and/or pipeline type and common tensioner designs include two, three or four track units (or possibly a variable number of track units). Each track unit includes an endless track, a chassis, support rollers or other bearing means mounted on the chassis for supporting the endless track, and one more track drive/brake members for effecting drive and/or braking motion of the track. The track is adapted to engage on the exterior of the pipeline, commonly as the track has friction pads engaging on said pipeline exterior.

It is known to arrange each track unit mobile within the associated frame so that the "gap" between the tracks can be adapted to different pipeline diameters and possible to allow for an "widely opened" position of the track units wherein a large item (e.g. an accessory fitted in or on the pipeline, such as a pipeline connector) can pass through the tensioner.

In U.S. Pat. No. 6,439,445 it is disclosed to provide hydraulic cylinders between the frame of the tensioner and each track unit to create the "squeeze pressure" between the track and the pipeline exterior needed to hold the pipeline on the basis of friction and also to allow for displacement of the track unit to adapt to the pipeline diameter. It will be understood that the "squeeze pressure" needed between the pipeline and the tracks is very significant as the resultant frictional force might need to be several tens of tonnes, or even well over one hundred tonnes. The desire for very large pipeline weight support capacity of the tensioner e.g. stems from the desire to develop oil and gas fields in deepwater, where water depth (and thus length of launched pipeline supported by the tensioner, or multiple tensioners in series) might be more than 500 meters, or even over 1000 meters.

The pipelines to be launched with a pipelaying vessel equipped with a marine pipelaying system including one or more tensioners can vary significantly, i.e. with respect to pipeline properties (rigid pipeline or flexible pipeline, coated or non coated, reeled or non-reeled, etc). Therefore the need exists for tensioners to be able to handle a wide range of different pipelines (possibly fitted with accessories having a larger cross-section than the pipeline itself).

The prior art tensioners have proven to be limited in respect of their range of application.

SUMMARY OF THE INVENTION

The present invention aims to propose an improved marine pipeline tensioner for use in the field of marine pipelaying.

According to a first aspect thereof the invention achieves the above aim by providing a marine pipeline tensioner wherein each track unit is arranged mobile within the associated frame by a parallel linkage bar system with multiple parallel linkage bars between each chassis of a track unit and the frame of the tensioner. Such a system is also known as a parallel link system or parallel link mechanism.

Preferably parallel linkage bars are respectively connected to the chassis near either end of said chassis.

More preferably one or more further parallel linkage bars are connected to the chassis in one or more intermediate positions, most preferred in a central area, of the chassis. This allows to additionally support the chassis in the centre to prevent undue bending of the track unit chassis in the central area. This has the advantage of preventing uneven squeeze pressure being exerted by the track on the pipeline being laid. This is e.g. desirable when laying flexible pipelines which are sensitive to excessive pressure being exerted thereon during pipelaying. It has been found that without one or more additional parallel linkage bars in between the ones positioned at the ends of the chassis, the chassis will need to be designed extremely stiff, which unduly increases the weight of the chassis and also does not allow to render the chassis more flexible if such would be desired as is explained herein.

Preferably an actuator, preferably a hydraulic cylinder, is arranged between the frame and the chassis of a track unit. Such an actuator could be referred to as a squeeze actuator. Other actuator designs can for instance be screw spindle actuators which have already been employed for pipeline tensioners.

In a preferred embodiment multiple actuators are provided between a track unit chassis and the frame at spaced locations along the length of the chassis, wherein control means are associated with said actuators that allow to independently control the force exerted by said actuators on the chassis. In a most preferred embodiment at least three actuators are provided between a track unit chassis and the frame at spaced locations along the length of the chassis. This allows to more or less independently control the actual squeeze pressure exerted by the tensioner track on the pipeline for each region of the chassis on which an actuator engages. When three actuators are used this allows e.g. to set the squeeze pressure in the central region of the chassis at a different level than at both end regions (which may also be set at different levels). Such control of the exerted squeeze pressure on the length of pipeline held between the tracks is highly advantages in view of the desired or required "holding capacity" on the one hand and the effects of the squeeze pressure on the pipeline (or its coating etc) on the other hand.

It is further preferred that said actuators are hydraulic cylinders and wherein said control means are hydraulic control means that allow to control the pressure within each cylinder independently.

It can be envisaged that for each parallel linkage bar which supports the track unit chassis there is provided an actuator. Preferably said actuator engages on the chassis in the vicinity of the connecting point of the parallel linkage bar.

For an accurate control of the pressure on the pipeline it is preferred that one or more, preferably each, of the connections of a parallel linkage bar to the chassis (and/or to the frame) or of an squeeze actuator to the chassis (and/or the frame) is provided with a load cell for measuring the actual force exerted at said location, and wherein a force signal obtained thereby is fed to a control system that allows to control the squeeze pressure in an associated region of the tensioner on the pipeline.

Preferably the tensioner has an annular frame comprising multiple ring frame members spaced along the axis of the tensioner and interconnected by further, preferably axially extending, frame members.

Preferably the tensioner frame is designed so that the tensioner can be opened.

In a preferred embodiment the tensioner frame includes a base part, e.g. essentially U-shaped in cross-section, onto which one or more two track units have been mounted, and two pivotal frame parts, which are each rotatable about a hinge axis, e.g. a series of aligned hinges arranged in ring frame members, wherein the free ends of the pivotal frame parts are interconnectable/detachable via connecting members, e.g. pins which can be fitted through aligned openings in the free ends.

According to a second aspect of the invention a marine pipeline installation tensioner is provided, wherein at least three actuators are provided between a track unit chassis and the frame at spaced locations along the length of the chassis, and wherein control means are associated with said actuators that allow to independently control the force exerted by said actuators on the chassis.

The advantage of said arrangement has already been elucidated for an embodiment wherein parallel linkage bars are used between the track unit chassis and the frame. Other designs of the support of the chassis with respect to the frame, such as slide or telescopic structures arranged—e.g. at right angles—to the chassis and the pipeline trajectory are also possible. Preference is however given to the parallel linkage bars, e.g. for their robustness and reliability.

A preferred embodiment of the inventive tensioner, including both aspects of the invention, will now be explained in detail referring to drawing.

DETAILED DESCRIPTION OF THE PREFERRED EMBODIMENTS

In the FIGS. 1-5 a preferred embodiment of the tensioner 40 according to the present invention is shown. The tensioner is shown in vertical orientation but can also be used in other orientations, such as inclined and horizontal as is well known in the art, or in a tiltable structure.

Figure 4A:
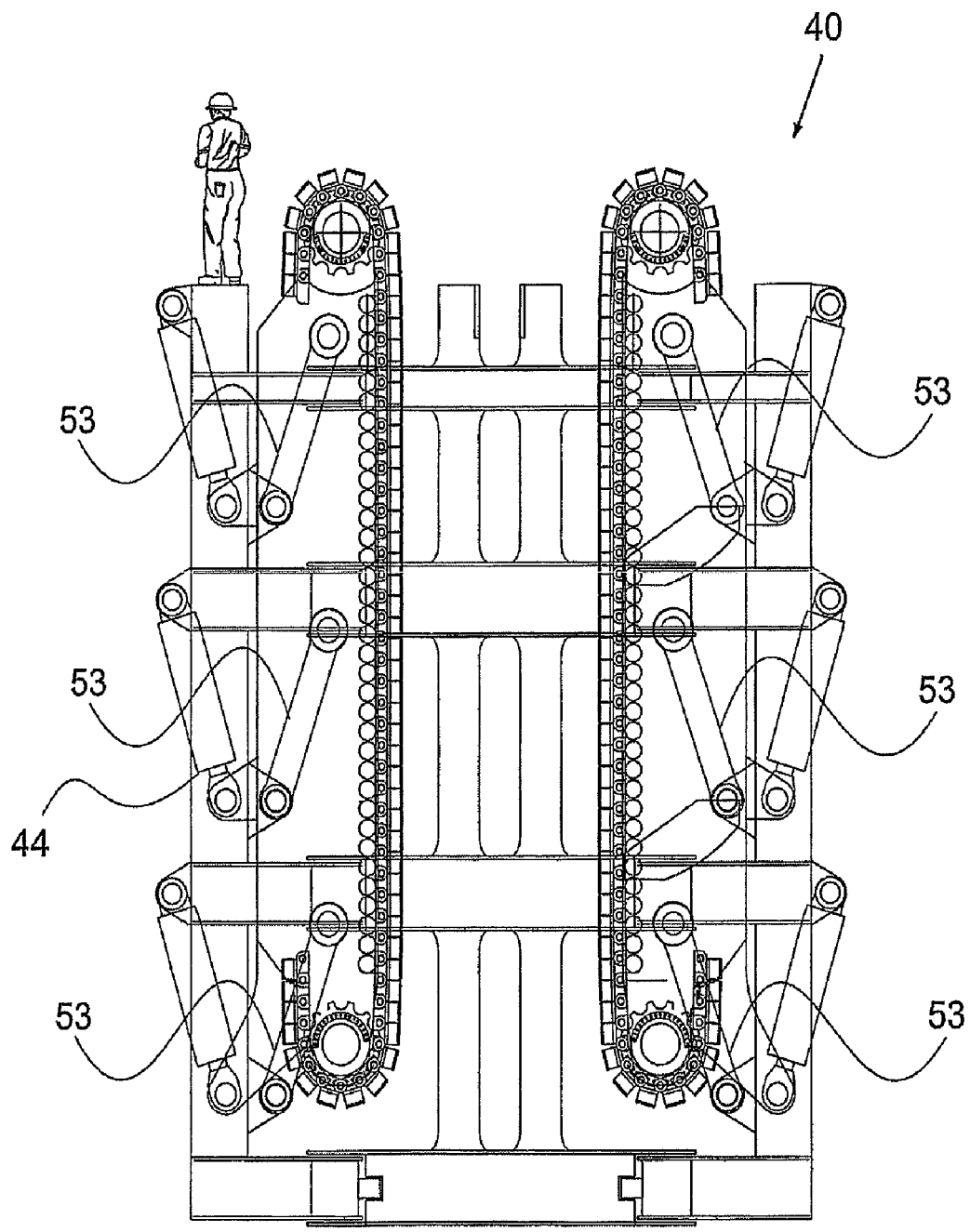
Figure 4B:
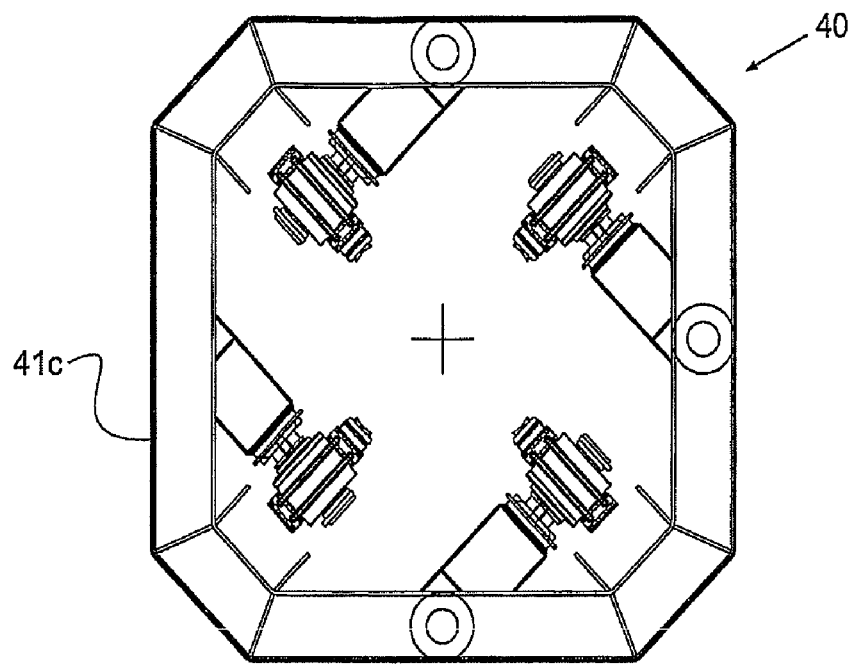
Figure 4C:
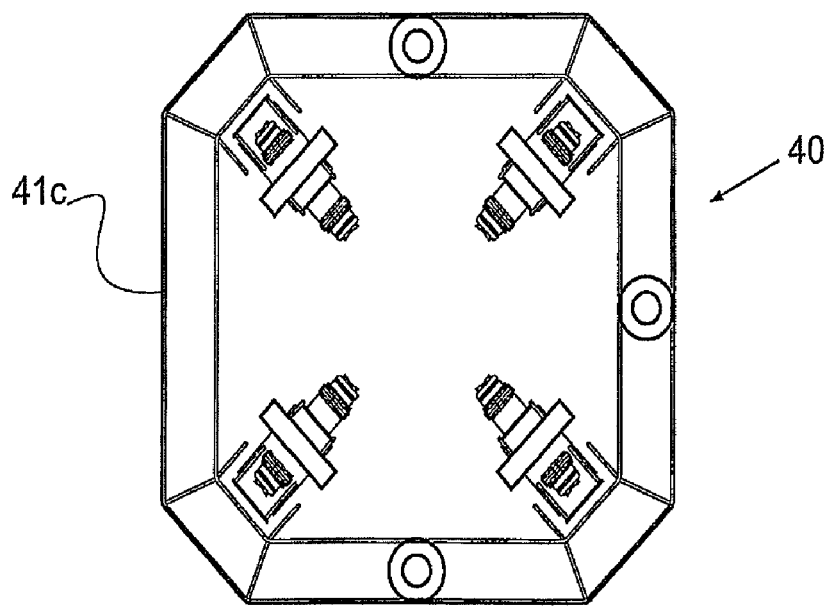
Figure 5A:
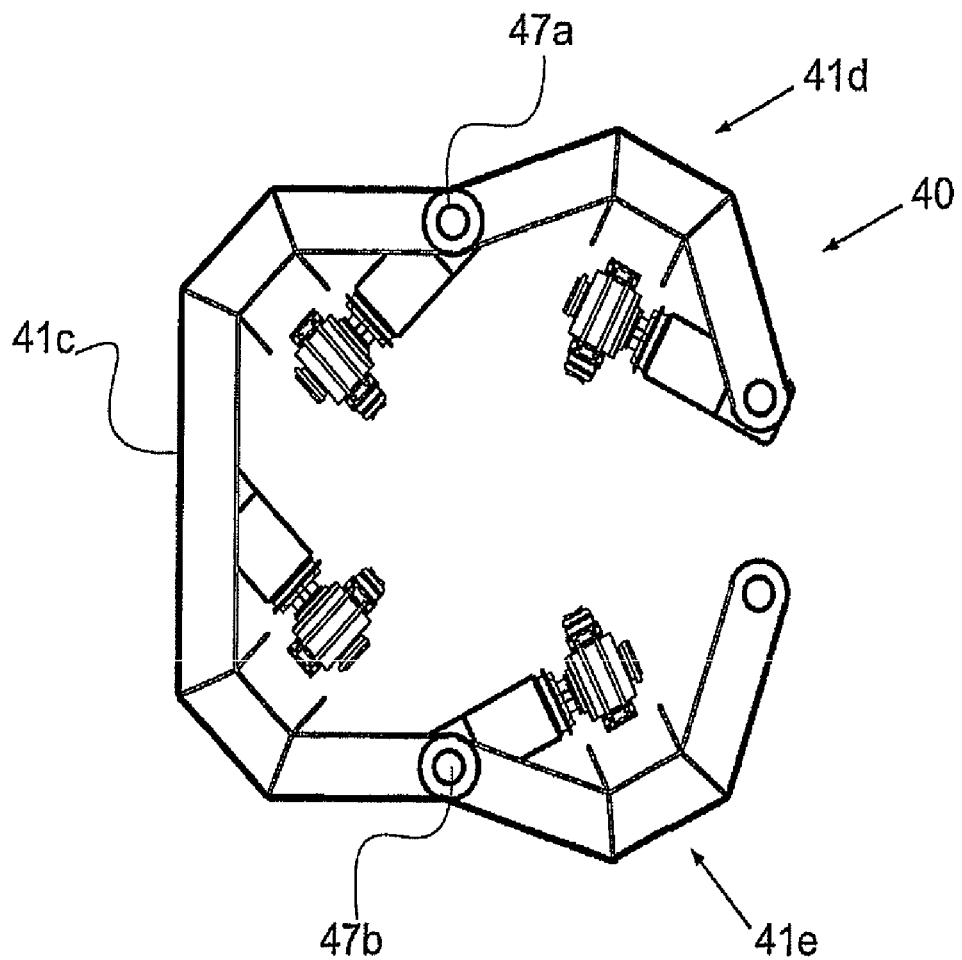
Figure 5B:
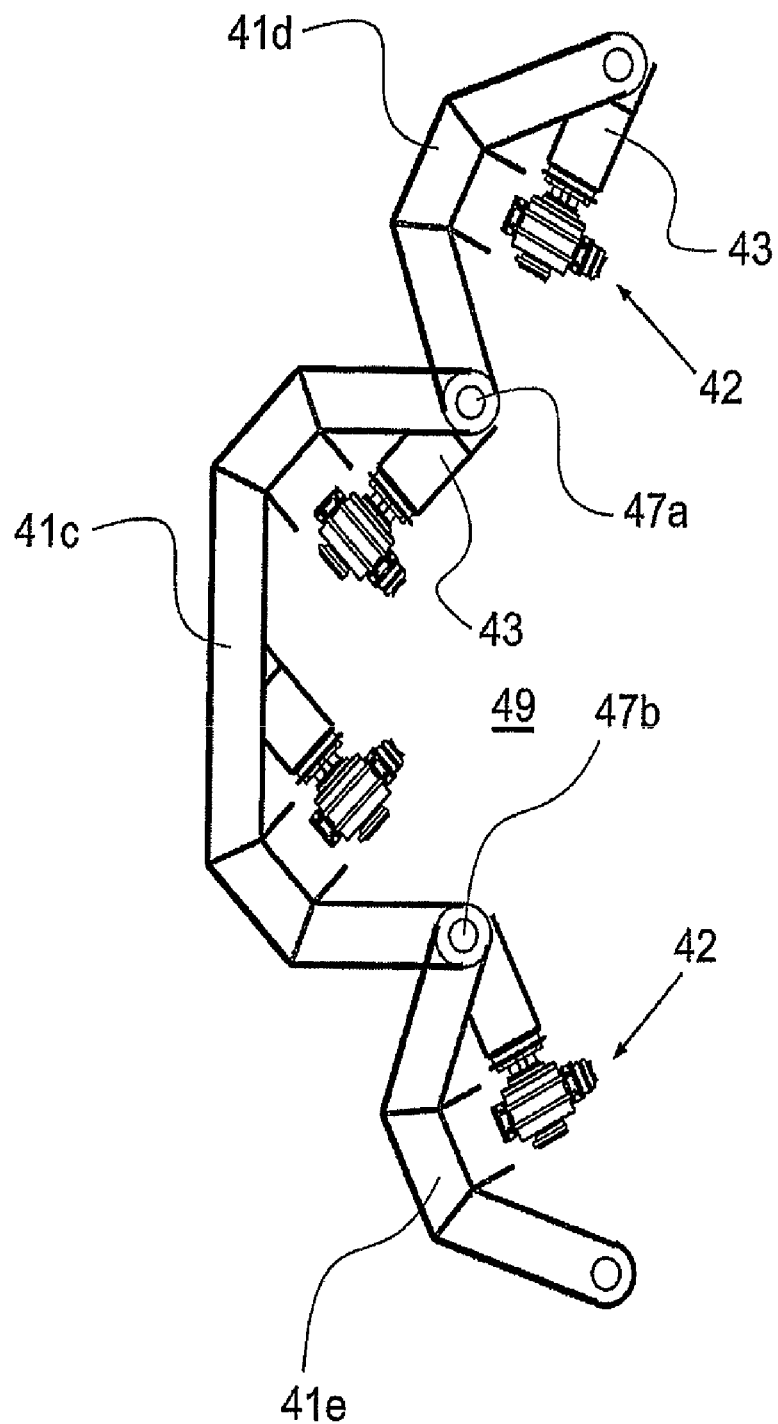

The tensioner 40 includes a tensioner frame 41 and multiple, here four, tracks 42 supported by said tensioner frame 41. The size of the exemplary tensioner 40 can be appreciated through FIG. 4a showing an operator standing on the frame of the tensioner.

Figure 1:
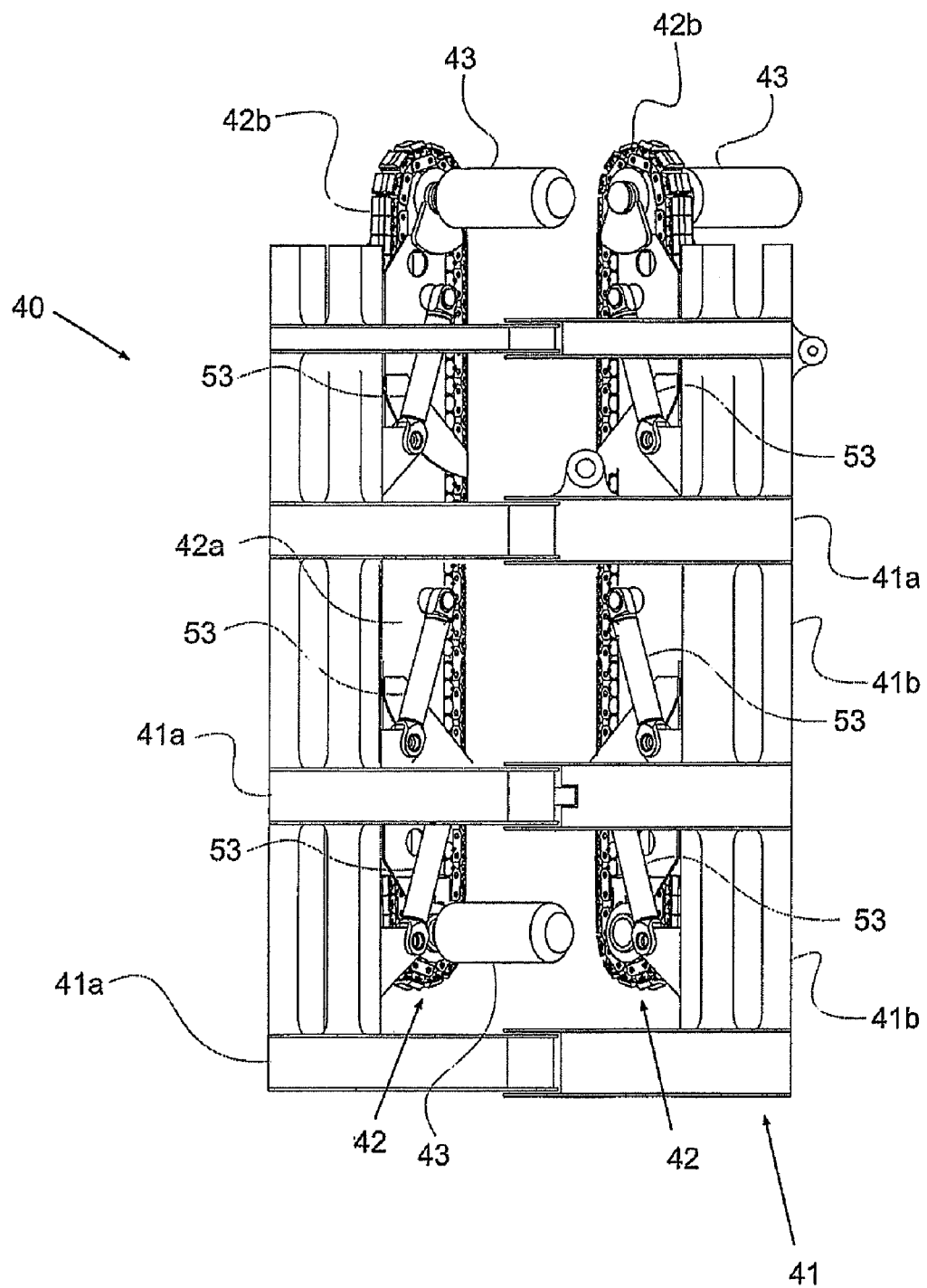
FIG. 1 shows in side view a preferred embodiment of the tensioner according to the invention.
Figure 2A:
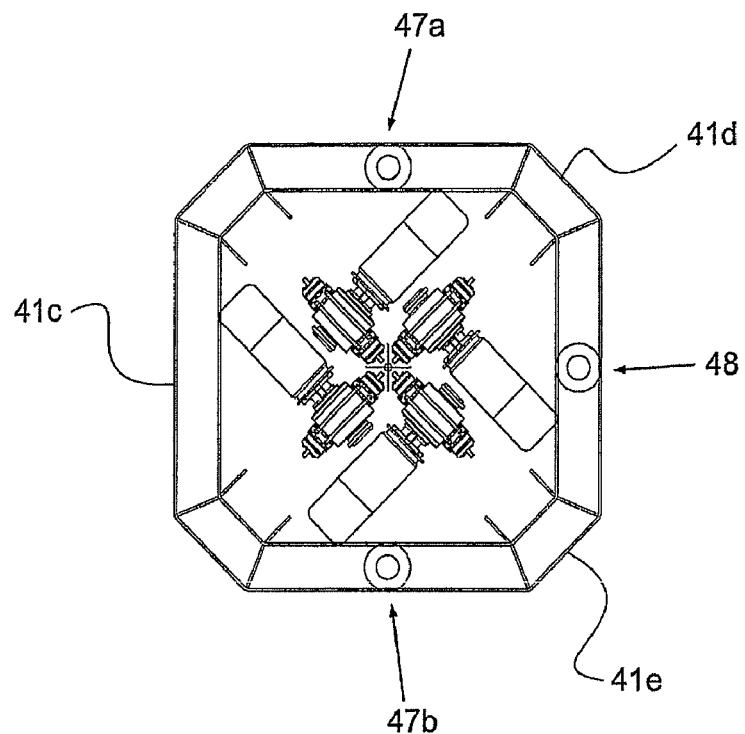
FIGS. 2a,b show a cross-section tensioner of FIG. 1 when handling smallest pipeline, FIGS. 3a,b,c show in cross-section tensioner of FIG. 1 when handling largest pipeline, FIGS. 4a,b,c show in cross-section tensioner of FIG. 1 when tensioner tracks fully spaced apart, and FIGS. 5a,b the tensioner of FIG. 1 in opened state to allow for introduction/removal of pipeline, passage of large item, respectively.
Figure 2B:
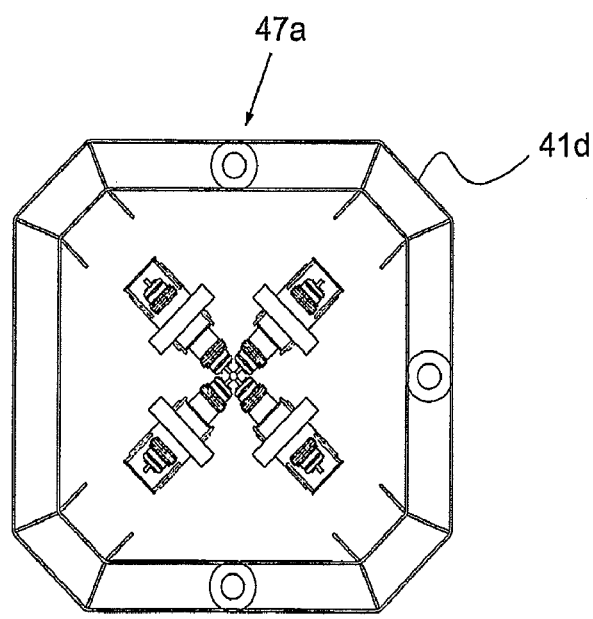
Figure 3A:
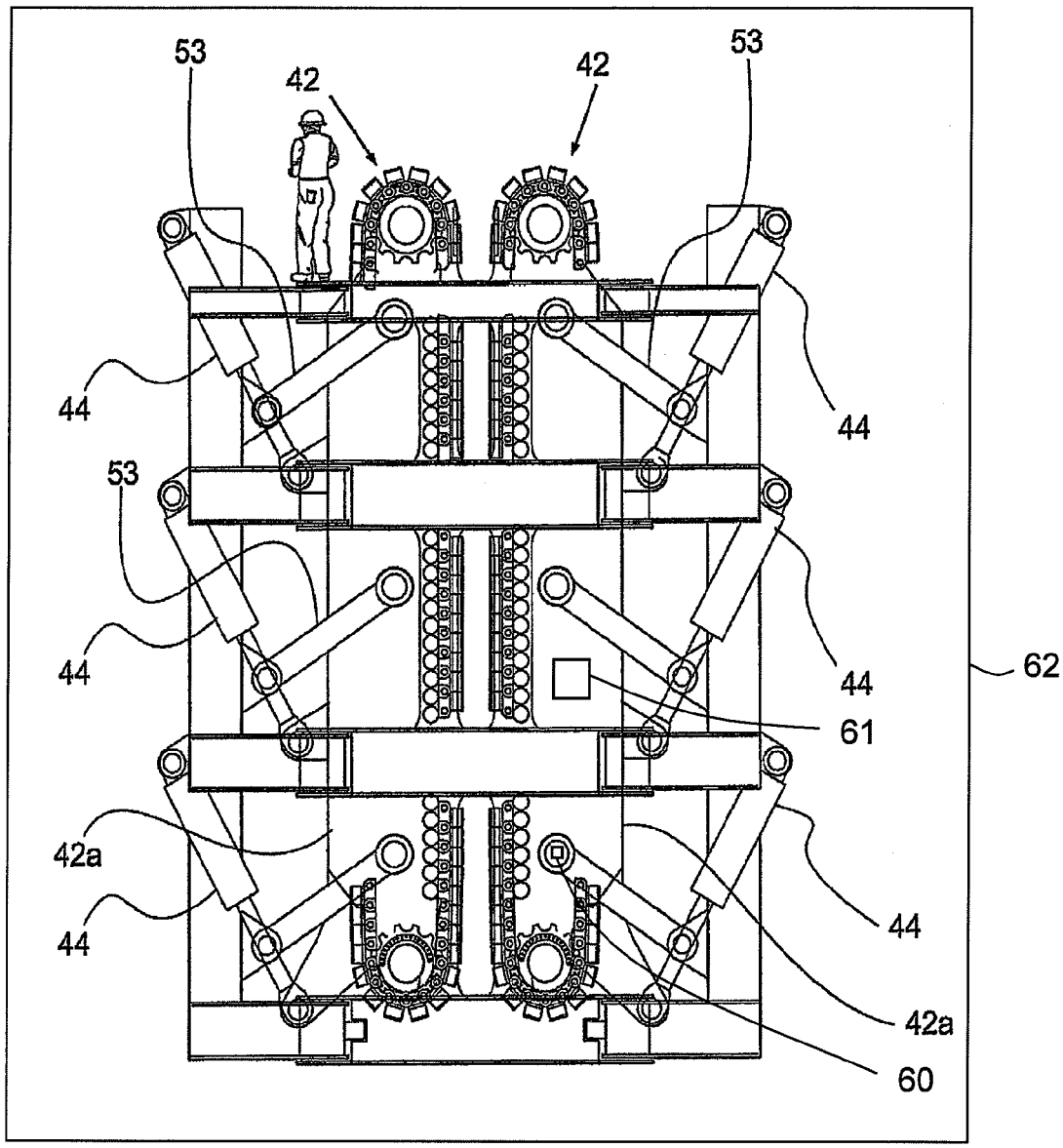
Figure 3B:
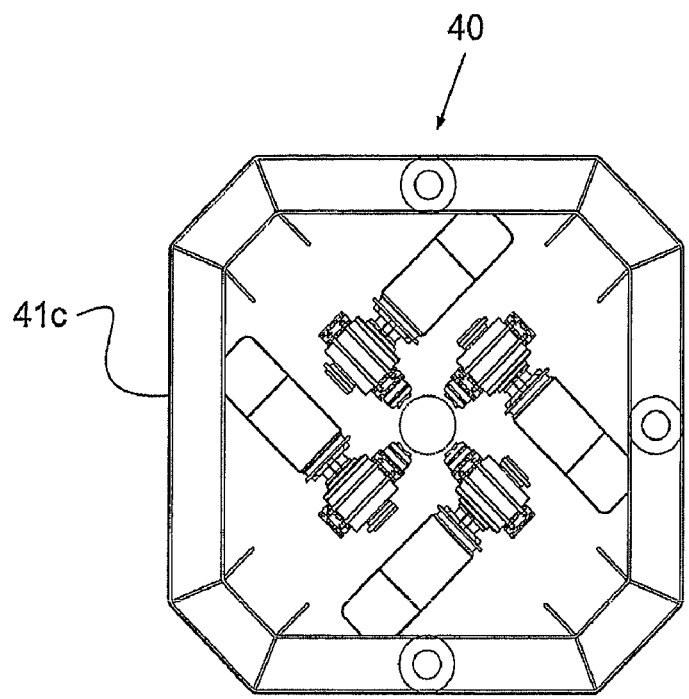
Figure 3C:
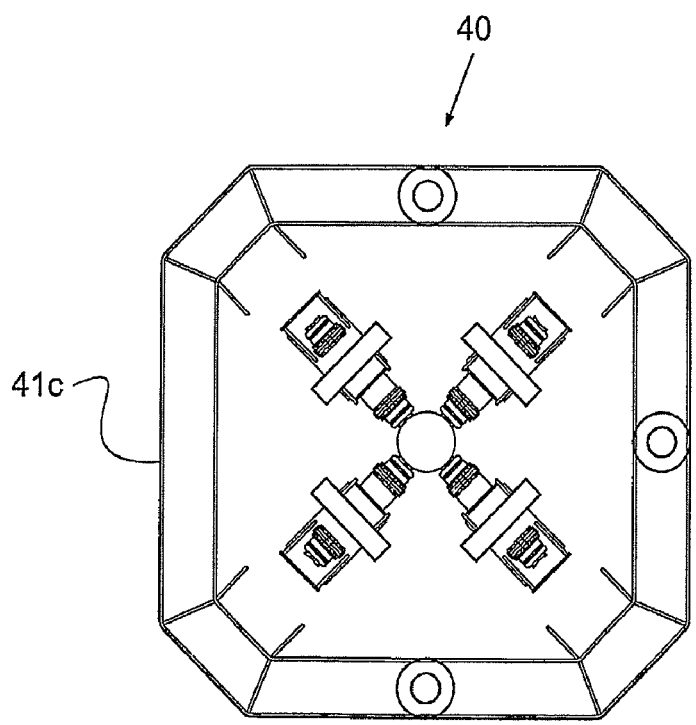

FIG. 3a shows a pipelaying vessel 62 equipped with a marine pipelaying system according to an embodiment of the present invention.

The frame 41 in the design shown here is of the annular frame type, here generally comprising multiple ring frame members 41a spaced along the axis of the tensioner 40 and interconnected by further (generally axially extending) frame members 41b.

The outer contour of the frame 41 here is about square, but other shapes, e.g. rectangular (e.g. for two tensioners) or triangular (when three tracks are used) are also possible.

In the design shown here, the tensioner frame 41 is designed so that the tensioner can be opened (see FIG. 5a,b) for lateral entry and/or removal of a pipeline into and/or from the tensioner. In this design the frame 41 includes a base part 41c, here essentially U-shaped in cross-section, onto which here two track units have been mounted, and two pivotable frame parts 41d,e. Each of those parts is rotatable about a series of aligned hinges 47a,b arranged in the ring frame members. The free ends of the pivotable frame parts 41b,c are interconnectable/detachable via connecting members 48, e.g. pins which can be fitted through aligned openings in the free ends.

In this design each pivotable frame part 41d,e can be pivoted such that the pivotable frame parts are displaced fully from their active position so as to create an open space or clear envelope 49 "in front of" the base part of the frame 41. As is preferred the frame parts 41d,e can pivot over more than 90 degrees outward.

The tracks 42b (each here basically an endless chain of interconnected friction pad carrying chain elements guided around chain supporting end rollers at each end of the chassis) here each form part of a track unit 42. Such a track unit 42 includes a robust chassis 42a, support rollers or other bearing means mounted thereon for the endless track, and one or more track motion control members 43 for effecting controlled motion of the associated track (that is normally a drive and/or braking and/or reverse motion of the track). In this example one or more hydraulic motors 43 are employed which control the motion of a track roller at an end of the tensioner, which track roller meshes with the track.

Each track unit 42 is arranged mobile within the associated frame 41, here by a parallel linkage bar system with parallel linkage bars 53 between the chassis 42a and the frame 41 of the tensioner. The bars 53 supporting a track unit chassis have pivots attached to the frame and the chassis and a uniform length between said pivots. Also the bars 53 are arranged so as to be parallel for each position of the bars.

In this preferred embodiment the chassis 42a of a track unit 42 is supported by parallel linkage bars 53 in the frame 41 not only at its axial ends (in this orientation the lower and upper ends) but also in one or more intermediate positions, here in a central position of the chassis 42a. This additional support by one or more intermediate parallel linkage bars of the chassis 42a allows to prevent undue bending of the track unit chassis 42a in the central area and thus prevents uneven pressure being exerted by the track 42b on the pipeline being laid. This is e.g. desirable when laying flexible pipelines which are susceptible to damage by locally exerting too much pressure.

It is even envisaged that said one or more intermediate parallel linkage bars are designed to be detached (e.g. at one end thereof) in order to allow for more flexibility of the chassis 42a of the tensioner. This is e.g. favoured when laying rigid pipelines, e.g. to accommodate for tolerances in diameter of the rigid pipelines. As explained below one could also decrease or eliminate any hydraulic force in said central region of the chassis 42*a* through suitable control/removal of the associated hydraulic actuator(s).

It is preferred that each linkage bar is at its ends connected via a connector pin to the frame and the chassis respectively, preferably a removable pin to allow for disconnecting of the linkage bar (at least for the centrally arranged linkage bars).

Preferably, as in this example, at each support position of the chassis 42*a* two adjacent parallel linkage bars 53 extend between the frame 41 and the chassis 42*a*.

A set of one or more actuators, here hydraulic cylinders 44, can effect the displacement of the track unit and thus allow for variation of the gap between the tracks 42*b* and exertion of pressure onto the pipeline to achieve the desired frictional force.

As is preferred a cylinder 44 has been placed at each location where the chassis 42*a* is connected to the frame via a parallel linkage bar 53. This allows to set the pressure with which the tracks 42*b* engage the pipeline for each region along the length of the chassis (here tow end regions and a central region). It also allows to control the bending behaviour of each track unit.

It is preferred to arrange the parallel linkage bars 53 facing upward (or counter to the pull exerted by the launched pipeline) toward the centreline of the tensioner when engaging on a pipeline. This causes some degree of "self-clamping" of the tracks 42*b* onto the pipeline. It is noted that in practice the majority of the clamping force is obtained by the hydraulic cylinders 44, so that accurate control of the exerted hydraulic pressure results in control of the clamping pressure.

It can be envisaged that each connection of a parallel linkage bar 53 to the chassis 42*a* (and/or to the frame) or of an actuator (hydraulic cylinder) to the chassis (and/or frame) is provided with a load cell 60 for measuring the actual force exerted at said location. This force signal can then used to control the squeeze pressure in the associated region of the tensioner (here that is in the end regions and in the central region), in this example by adjusting the pressure in each of the cylinders independently.

It is preferred that each hydraulic cylinder is provided with a pressure sensor sensing the actual pressure within said cylinder, said sensor being integrated in a hydraulic control system of the tensioner.

Preferably a valve arrangement is associated with each cylinder to control the pressure within said cylinder.

It is envisaged that each hydraulic cylinder associated with as specific region of the chassis, e.g. the ends and/or central region, can be controlled independently by a suitable hydraulic control system in order to control the pressure exerted in said region of the tensioner on the pipeline.

One can also envisage an embodiment wherein e.g. the hydraulic cylinder(s) associated with the central region of the tensioner are disabled/removed so that no hydraulic force is exerted in said region when more flexibility of the chassis is preferred for handling a pipeline, e.g. to when laying rigid and/or coated pipes having diameter variations due to tolerances in manufacturing. Flexibility of the chassis allows for the passage of the thicker part of the pipeline without exerting undue stress on the pipeline.

It is also preferred to provide position-sensing means 61 in the tensioner to be able to sense the position of at least one of the tracks units. It is envisaged that in a set of opposed track units, position sensing is used to hold one track at a stationary position, wherein an opposing track is operate to be mobile and to be controlled on the basis of pressure exerted on the pipeline. It is clear that upon increasing said pressure, said "position controlled track unit of the tensioner" will tend to move backwards, which is then corrected on the basis of position control. This allows to keep the pipeline in the intended pipeline trajectory and avoids undesirable non-uniform loading on the pipeline.

The invention claimed is:

1. A marine pipeline installation tensioner comprising a tensioner frame and multiple track units mounted in said frame,
    wherein each track unit includes an endless track, a chassis, bearing means, mounted on said chassis for supporting the endless track, and one or more track motion control members for effecting controlled motion of the track, and wherein each track unit is arranged mobile within the associated frame by a parallel linkage bar system with parallel linkage bars between the chassis of the track unit and the frame of the tensioner,
    wherein the parallel linkage bars are respectively connected to the chassis of a track unit near either end of said chassis, and one or more further parallel linkage bars are connected to the chassis in intermediate positions of the chassis, such that said chassis of the track unit is supported at least in both end regions thereof as well as in a central region by each of said parallel linkage bars,
    wherein at least three actuators are provided between each track unit chassis and the frame, and the at least three actuators are provided at spaced locations along the length of the chassis,
    wherein two of the at least three actuators are connected to the chassis of the track unit and are respectively near opposite ends of the chassis, and another one of the at least three actuators is connected to the chassis of the track unit in an intermediate position of the chassis, such that the at least three actuators exert a force on the chassis at least in both end regions of the chassis as well as in a central region of the chassis, and
    wherein control means are associated with said at least three actuators that allow to independently control the force exerted by said at least three actuators on the chassis, and thus to control a bending behaviour of the chassis and to independently set a pressure with which the tracks engage the pipeline at different regions along the length of each chassis.

2. The marine pipeline installation tensioner according to claim 1, wherein one or more of the connections of a parallel linkage bar to the chassis or of an actuator to the chassis is provided with a load cell for measuring the actual force exerted at said location, and wherein a force signal obtained thereby is fed to a control system that allows to control the squeeze pressure in an associated region of the tensioner on the pipeline.

3. The marine pipeline installation tensioner according to claim 1, wherein said actuators are hydraulic cylinders and wherein said control means are hydraulic control means that allow to control the pressure within each cylinder independently.

4. The marine pipeline installation tensioner according to claim 1, wherein an actuator is associated with each parallel linkage bar supporting the chassis.

5. The marine pipeline installation tensioner according to claim 4, wherein said actuator engages on the chassis in the vicinity of the connecting point of the parallel linkage bar.

6. The marine pipeline installation tensioner according to claim 1, wherein the tensioner has an annular frame comprising multiple ring frame members spaced along the length of the tensioner and interconnected by further frame members.

7. The marine pipeline installation tensioner according to claim 1, wherein the tensioner frame is designed so that the tensioner frame can be opened for lateral entry and removal of a pipeline into and from the tensioner.

8. The marine pipeline installation tensioner according to claim 7, wherein the tensioner frame includes a base part, onto which one or more track units have been mounted, and two pivotable frame parts, which are each rotatable about a hinge axis, wherein the free ends of the pivotable frame parts are interconnectable/detachable via connecting members.

9. The marine pipeline installation tensioner according to claim 1, wherein position-sensing means are provided to sense the position of at least one of the tracks units within the frame.

10. A marine pipeline installation vessel including the marine pipeline installation tensioner according to claim 1.

* * * * *